(12) United States Patent
Zheng et al.

(10) Patent No.: US 10,739,252 B2
(45) Date of Patent: Aug. 11, 2020

(54) TERAHERTZ ANTENNA BASED ON MULTI-FREQUENCY TRANSMISSION SWITCHING AND SPECTRAL DETECTION DEVICE THEREOF

(71) Applicant: Tsinghua University, Beijing (CN)

(72) Inventors: Xiao-Ping Zheng, Beijing (CN);
Xia-Hui Han, Beijing (CN); Hua Geng, Beijing (CN); Sheng-Chuang Bai, Beijing (CN); Xiao-Jiao Deng, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 16/438,462

(22) Filed: Jun. 11, 2019

(65) Prior Publication Data

US 2020/0049620 A1 Feb. 13, 2020

Related U.S. Application Data

(63) Continuation of application No. PCT/CN2018/092449, filed on Jun. 22, 2018.

(30) Foreign Application Priority Data

Mar. 12, 2018 (CN) .......................... 2018 1 0201229

(51) Int. Cl.
*G01N 21/3581* (2014.01)
*H01Q 5/22* (2015.01)
(Continued)

(52) U.S. Cl.
CPC ....... *G01N 21/255* (2013.01); *G01N 21/3581* (2013.01); *H01Q 1/225* (2013.01);
(Continued)

(58) Field of Classification Search
CPC .... H01Q 21/00; H01Q 21/062; H01Q 21/065; H01Q 21/0075; H01Q 13/065;
(Continued)

(56) References Cited

U.S. PATENT DOCUMENTS

2010/0033709 A1* 2/2010 Lampin ................ H01Q 1/38
356/51
2013/0340624 A1 12/2013 Webber

FOREIGN PATENT DOCUMENTS

CN 103855228 6/2014
CN 106654594 5/2017

OTHER PUBLICATIONS

Progress of Detection Technology of Ultra-Broadband THz Time-Domain Spectroscopy, Dong, Jia-meng et al., Spectroscopy and Spectral Analysis, May 31, 2016, vol. 36, No. 5.

* cited by examiner

*Primary Examiner* — David P Porta
*Assistant Examiner* — Fani Boosalis

(57) ABSTRACT

The present application relates to a terahertz transmitting antenna including a microstrip feed line, a substrate, at least two antenna switches, at least one conducting plate, an insulating layer and at least two antenna patches. The terahertz transmitting antenna is provided with at least two antenna switches and at least two corresponding antenna patches, which substantially increases a transmitting bandwidth and a corresponding transmitting power of the terahertz transmitting antenna. The terahertz transmitting antenna with the increased transmitting bandwidth and the increased transmitting power can be applied to a small sized terahertz spectral detection device to assist the transmitting source to transmit the signal in the terahertz band. The terahertz transmitting antenna adopting the multi-frequency switching technology can reduce an operation time of a (Continued)

spectral fingerprint recognition algorithm to rapid identify specific target substances.

15 Claims, 2 Drawing Sheets

(51) Int. Cl.
    *G01N 21/25*     (2006.01)
    *H01Q 1/22*     (2006.01)
    *H01Q 21/00*     (2006.01)
    *H01Q 21/06*     (2006.01)

(52) U.S. Cl.
    CPC ........... *H01Q 5/22* (2015.01); *H01Q 21/0075* (2013.01); *H01Q 21/065* (2013.01)

(58) Field of Classification Search
    CPC ...... H01Q 1/225; H01Q 5/22; G01N 21/3581; G01N 21/255
    See application file for complete search history.

TERAHERTZ ANTENNA BASED ON MULTI-FREQUENCY TRANSMISSION SWITCHING AND SPECTRAL DETECTION DEVICE THEREOF

CROSS-REFERENCE TO RELATED APPLICATIONS

This application claims all benefits accruing under 35 U.S.C. § 119 from China Patent Application No. 201810201229.X, filed on Mar. 12, 2018 in the State Intellectual Property Office of China, the content of which is hereby incorporated by reference. This application is a continuation under 35 U.S.C. § 120 of international patent application PCT/CN2018/092449 filed on Jun. 22, 2018, the content of which is also hereby incorporated by reference.

FIELD

The present application relates to the field of terahertz spectroscopy application technology, and particularly to a terahertz transmitting antenna and a terahertz spectral detection device.

BACKGROUND

In hazardous chemical accidents, immediate identification of composition, content, and distribution of hazardous chemicals is important to promptly and effectively implement emergency response and procedure. The vibration frequencies or rotation frequencies of organic molecules contained in common hazardous chemicals are in terahertz band (0.1 THz to 10 THz), where the molecules exhibit strong spectral fingerprint characteristics. Therefore, terahertz spectroscopy technology has a significant practical application in detecting hazardous chemicals in the air.

A bandwidth of the entire terahertz spectral detection system should be above 1 THz to identify multiple components. However, in conventional terahertz source technology, the bandwidth of a single frequency point is tens to hundreds GHz. Moreover, the power of the terahertz source is very weak, generally only a few milliwatts.

SUMMARY

What is needed, therefore, is to provide a terahertz transmitting antenna and a terahertz spectral detection device.

A terahertz transmitting antenna comprises:
a substrate comprising a first surface and a second surface opposite to the first surface;
a microstrip feed line disposed on the first surface;
at least two antenna switches spaced from each other and disposed on the second surface;
at least one conducting plate disposed on the second surface, and one conducting plate is disposed between each two adjacent antenna switches;
an insulating layer covering the at least one conducting plate and the at least two antenna switches, the at least one conducting plate and the at least two antenna switches are disposed between the insulating layer and the substrate;
at least two antenna patches spaced from each other and disposed on a surface of the insulating layer away from the substrate;
wherein each antenna switch is opposite to one antenna patch such that a terahertz wave transmitted in the microstrip feed line generates an excitation to the antenna patch through the antenna switch.

In an embodiment, the terahertz transmitting antenna further comprises:
at least two conducting electrodes disposed in the insulating layer, each conducting electrode is spaced from and opposite to one antenna switch;
wherein open and closed states of the antenna switch are controlled by varying a voltage between the conducting electrode opposite to the antenna switch and the conducting plate.

In an embodiment, the at least two antenna switches have different widths and correspondingly transmit terahertz waves with different frequency widths.

In an embodiment, the widths of the at least two antenna switches decrease along a fixed direction, and the transmission frequencies of the at least two antenna switches increase along the fixed direction.

In an embodiment, a material of the at least two antenna switches is dielectric.

In an embodiment, the material of the at least two antenna switches is graphene, and the graphene is disposed on the second surface.

A terahertz spectral detection device, comprising:
a terahertz spectrum transmitting unit;
a terahertz spectrum transmission unit signally coupled to the terahertz spectrum transmitting unit;
a terahertz spectrum transmitting antenna, the terahertz spectrum transmission unit signally coupling the terahertz spectrum transmitting unit to the terahertz transmitting antenna;
a terahertz spectrum receiving unit configured to receive a signal with a terahertz frequency transmitted by the terahertz transmitting antenna; and
a terahertz spectrum analysis and identification unit signally coupled to the terahertz spectrum receiving unit.

In an embodiment, a transmission of terahertz frequency signal is directly implemented between the terahertz transmitting antenna and the terahertz spectrum receiving unit.

In an embodiment, the terahertz spectral detection device further comprises a reflecting mirror, wherein the reflecting mirror is configured to implement the transmission of terahertz frequency signal between the terahertz transmitting antenna and the terahertz spectrum receiving unit.

In an embodiment, the terahertz spectral detection device further comprises a terahertz spectrum display unit, wherein the terahertz spectrum display unit is electrically connected to the terahertz spectrum analysis and identification unit to display detected information.

The present application provides the terahertz transmitting antenna comprising the microstrip feed line, the substrate, the at least two antenna switches, the at least one conducting plate, the insulating layer, and the at least two antenna patches. The terahertz transmitting antenna is provided with at least two antenna switches and at least two corresponding antenna patches, which substantially increases a transmitting bandwidth and a corresponding transmitting power of the terahertz transmitting antenna. The terahertz transmitting antenna with the increased transmitting bandwidth and the increased transmitting power can be applied to a small sized terahertz spectral detection device to assist the transmitting source to transmit the signal in the terahertz band. The terahertz transmitting antenna adopting the multi-frequency switching technology can reduce an operation time of a spectral fingerprint recognition algorithm to rapid identify specific target substances.

BRIEF DESCRIPTION OF THE DRAWINGS

Implementations are described by way of example only with reference to the attached figures.

DETAILED DESCRIPTION

Numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described.

Figure 1:
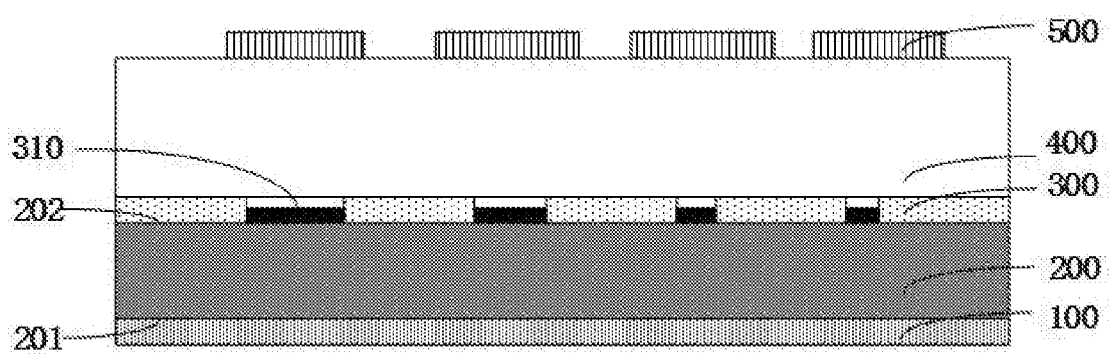
FIG. 1 is a schematic structural view of an embodiment of a terahertz transmitting antenna.

Referring to FIG. 1, one embodiment of a terahertz transmitting antenna 10 comprises a microstrip feed line 100, a substrate 200, at least two antenna switches 310, a conducting plate 300, an insulating layer 400, and at least two antenna patches 500.

A material of the substrate 200 is not specifically limited. For example, the substrate 200 can be silicon dioxide. The substrate 200 has a first surface 201 and a second surface 202. The first surface 201 and the second surface 202 can be opposite to each other. In one embodiment, a bottom surface of the substrate 200 can be the first surface 201, and a top surface of the substrate 200 can be the second surface 202.

The microstrip feed line 100 can be disposed on the first surface 201. One or more conducting plates 300 can be disposed on the second surface 202 and spaced from each other. The microstrip feed line 100 and the conducting plate 300 can be formed through a physical or chemical deposition method. The microstrip feed line 100 can be a conductive copper strip. The conducting plate 300 can be a conductive copper film. The microstrip feed line 100 disposed on the first surface 201 is configured to transmit terahertz waves. In one condition, the terahertz waves transmitted in the microstrip feed line 100 can generate an excitation to the antenna patch 500. In another condition, the terahertz waves in the microstrip feed line 100 can transmit continuously in the direction of the microstrip feed line 100.

The antenna switches 310 are located in a same layer with the conducting plates 300. In one embodiment of the terahertz transmitting antenna 10, the antenna switch 310 has a thickness of about 1 micrometer. The antenna switch 310 can be a single layer of graphene or two laminated graphene layers. One conducting plate 300 is disposed at an interval between at least two adjacent antenna switches 310. One antenna switch 310 is also disposed at an interval between at least two adjacent conducting plates 300. The antenna switch 310 can be in two states, which are a closed state and an open state. When the antenna switch 310 is in the open state, the terahertz waves in the microstrip feed line 100 can be transmitted to the antenna patch 500 through the antenna switch 310. When the antenna switch 310 is in the closed state, the terahertz waves in the microstrip feed line 100 cannot be transmitted to the antenna patch 500 through the antenna switch 310, but continue to be transmitted in the direction of the microstrip feed line 100. The antenna switch 310 and the conducting plate 300 can have different thicknesses. The thickness of the antenna switch 310 can be less than the thickness of the conducting plate 300.

The insulating layer 400 can be disposed on the surface of the conducting plate 300 and the surface of the antenna switch 310 away from the substrate 200. The insulating layer 400 is configured to block electrical connection between the conducting plate 300 and the antenna patch 500. The material of the insulating layer 400 is not specifically limited. In one embodiment, the insulating layer 400 can be made of high-resistance silicon.

The antenna patches 500 are disposed in a one-to-one correspondence with the antenna switches 310. In one embodiment, two antenna switches 310 are provided, and each of the two antenna switches 310 has one antenna patch 500 disposed at a location corresponding to. A width of the antenna patch 500 is greater than or equal to a width of the corresponding antenna switch 310, so that the terahertz waves in the microstrip feed line 100 can be transmitted to the antenna patch 500 through the antenna switch 310.

In one embodiment, at least two antenna switches 310 and at least two corresponding antenna patches 500 are provided, which substantially increases the transmitting bandwidth of the terahertz transmitting antenna 10 and increases the corresponding transmitting power. The terahertz transmitting antenna with the relatively high transmitting bandwidth and the relatively high transmitting power can be applied in a small sized terahertz spectral detection device to assist the transmitting source to transmit the signal in the terahertz band. The terahertz transmitting antenna 10 splices a plurality of terahertz sources having different transmitting frequency bands through a multi-frequency transmitting antenna array to realize spectrum detection in a wide frequency band. By applying the terahertz transmitting antenna 10 in the terahertz spectral detection device, the terahertz transmitting antenna 10 can realize a spatial adjustment of the beams, improve the gain of the beams in a specific direction, and make up for the insufficient total transmitting power. The terahertz transmitting antenna 10 adopting the multi-frequency switching technology can reduce an operation time of a spectral fingerprint recognition algorithm to rapid identify specific target substances.

Figure 2:
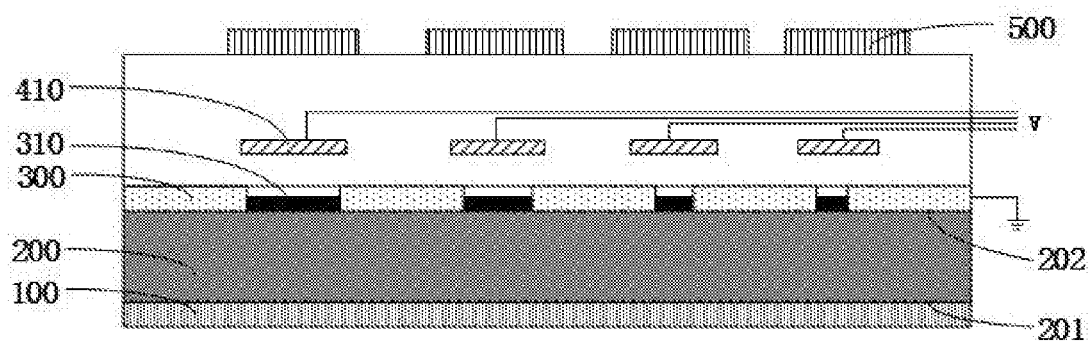
FIG. 2 is a schematic structural view of another embodiment of the terahertz transmitting antenna.

Referring to FIG. 2, in an embodiment, the terahertz transmitting antenna 10 further comprises a conducting electrode 410. At least two conducting electrodes 410 can be disposed in the insulating layer 400. The conducting electrodes 410 are opposite to the antenna switches 310 in a one-to-one manner. Specifically, the conducting electrode 410 and the antenna switch 310 can be spaced from each other, and the insulating layer 400 can be deposited between the conducting electrode 410 and the antenna switch 310. The conducting electrode 410 and the antenna switch 310 are spaced to avoid a direct contact between the conducting electrode 410 and the antenna switch 310, and also to prevent a direct contact between the conducting plate 300 and the conducting electrode 410. The open and closed states of the antenna switch 310 can be changed by applying a voltage between the conducting electrode 410 and the conducting plate 300. In one embodiment, the antenna switch 310 can be made of a graphene material. When a bias voltage of 0 V is applied between the conducting electrode 410 and the conducting plate 300, the graphene material behaves as a dielectric with an electrical conductivity of 666.67 S/m, such that the antenna switch 310 is in the open state, and the terahertz waves in the microstrip feed line 100 can generate an excitation to the upper antenna patch 500 through the antenna switch 310. When the bias voltage applied between the conducting electrode 410 and the conducting plate 300 is 15 V, the graphene material is behaves as a conductor with an electrical conductivity of $10^7$ S/m, such that the antenna switch 310 is in the closed state, and the terahertz waves in the microstrip feed line 100 can continue transmitting in the direction of the microstrip feed line 100.

In one embodiment, the open and closed states of the antenna switch 310 can be switched by applying different voltages between the conducting electrode 410 and the conducting plate 300. The terahertz transmitting antenna 10 respectively excites the at least two antenna patches 500 with different transmitting frequencies through the microstrip feed line 100. The antenna switch 310 is disposed at the interval between two adjacent conducting plates 300. Different antenna switches 310 respectively correspond to different frequency bands. The antenna switches 310 can improve isolation between different frequency bands and thus reduce an energy loss of the terahertz wave. In an embodiment, the graphene can be used as the antenna switch 310, since the graphene has a complex conductivity in the terahertz band, and can be switched between the conducting state and the dielectric state by having different voltage biases applied thereto.

Referring to FIG. 2, in an embodiment, the at least two antenna switches 310 have different widths, and correspondingly transmit terahertz waves with different frequency widths. For example, the terahertz transmitting antenna 10 can comprise four antenna switches 310. The widths of the four antenna switches 310 are different. The entire terahertz transmit antenna 10 can be seen as being consisted by four slot microstrip sub-antennas coupled together. Each microstrip sub-antenna comprises at least one set of the microstrip feed line 100, and the size of the antenna patch 500 and the antenna switch 310 of each microstrip sub-antenna correspond to different transmitting frequency band.

In an embodiment, the widths of the at least two antenna switches 310 decrease along a fixed direction. The transmission frequencies of the at least two antenna switches 310 increase along the fixed direction. It can be understood that when the widths of the at least two antenna switches 310 vary along the fixed direction, the varying can be sequentially increasing, sequentially decreasing, or an irregular change. The fixed direction can be from left to right as shown in FIG. 1 or FIG. 2, and the widths of the antenna switches 310 can be successively decreased along the fixed direction. The decreased width of the antenna switches 310 can be related to the transmitting frequency of the terahertz transmitting antenna 10. Specifically, the variation of the widths of the at least two antenna switches 310 can be different according to the terahertz frequency that the device needs to transmit.

In one embodiment of the terahertz transmitting antenna 10, the widths of the four antenna switches 310 are sequentially decreased from left to right to achieve a continuous variation in the transmission frequency of the terahertz transmitting antenna 10. In one embodiment, the scanning frequency band of the terahertz transmitting antenna 10 can sequentially correspond to four terahertz quantum cascade lasers of 1.0 THz-1.5 THz, 1.5 THz-2.0 THz, 2.0 THz-2.5 THz, and 2.5 THz-3.0 THz. The terahertz transmitting antennas 10 can have a bandwidth of 1 THz-3 THz in a combination of the four frequency bands.

In an embodiment, the terahertz spectral detection device 20 can identify various substance components by having the terahertz transmit antenna 10 with the relatively wide scanning frequency band of 1.0 THz to 3.0 THz.

In an embodiment, the material of the at least two antenna switches 310 has a dielectric characteristic. For example, the material of the antenna switch 310 can have a variable electrical conductivity. The conductivity of the material of the antenna switch 310 can be adjusted by varying the voltage applied to the antenna switch 310. The antenna switch 310 can be opened or closed by varying the conductivity of the material of the antenna switch 310. The state change of the antenna switch 310 further changes the transmitting of the terahertz transmit antenna 10.

The fabrication process of the terahertz transmitting antenna 10 can be as follows. A silicon dioxide dielectric layer can be provided as the substrate 200. A copper strip can be deposited on the bottom surface of the substrate 200 to form the microstrip feed line 100. A copper film can be deposited on the top surface of the substrate 200. Four slits can be etched on the upper copper film, and the structure and size of each slit can be designed according to the transmitting frequency band of the terahertz transmitting antenna 10. The graphene in the same size with the slit can be transferred or formed in the corresponded slit by a CVD method. The entire copper film can be used as the conducting plate 300, and can be grounded. The graphenes deposited in the four slits can be used as the antenna switches 310. High-resistance silicon can be grown over the copper film as the insulating layer 400. A polysilicon electrode can be formed as the conducting electrode 410 above the graphene in each slit. Varying voltages can be applied on the conducting electrode 410 and the conducting plate 300 to adjust the conductivity of the graphene in each slit. The antenna patches 500 can be respectively provided on the surface of the insulating layer 400 above the graphenes in the slits, and each antenna patch 500 has a size corresponding to a single frequency band. The greater the wavelength, the larger the size of the slit. In one embodiment, the terahertz wave enters from the left, the sizes of the slits in the terahertz transmitting antenna 10 increase from left to right, and the corresponding transmitting frequencies decrease from high to low.

In an embodiment, a terahertz spectral detection device 20 comprises a terahertz spectrum transmitting unit 1, a terahertz spectrum transmission unit 2, the terahertz transmitting antenna 10, a terahertz spectrum receiving unit 3, and a terahertz spectrum analysis and identification unit 4.

The terahertz spectrum transmitting unit 1 is configured to generate a broadband terahertz wave signal. The terahertz spectrum transmitting unit 1 can be a terahertz source capable of emitting broad spectrum of terahertz waves or can be a broad spectrum array comprising a plurality of single frequency terahertz wave sources. For example, the terahertz spectrum transmitting unit 1 can be a multiplier chain terahertz source, an optically rectified tunable terahertz source, or a terahertz quantum cascade laser.

The terahertz spectrum transmission unit 2 is configured to transmit the broadband terahertz wave generated by the broadband terahertz transmitting source to the terahertz transmitting antenna 10. The terahertz spectrum transmission unit 2 can be a waveguide transmission unit, a microstrip line transmission unit, a dielectric microstrip line transmission unit, or a photonic crystal fiber transmission unit.

The terahertz transmitting antenna 10 can be an antenna array composed of a plurality of antennas with different transmitting frequency bands. The terahertz transmitting antenna 10 can have a switch therein, which can be switched to a transmitting antenna of a specific frequency band as needed. In the plurality of antennas, a single antenna can be a microstrip antenna, a leaky wave antenna, a lens antenna, a horn antenna, or a parabolic antenna. Specifically, the terahertz transmitting antenna 10 can comprise a microstrip feed line 100, a substrate 200, at least two antenna switches 310, at least one conducting plate 300, an insulating layer 400, and at least two antenna patches 500. The substrate 200 can comprise a first surface 201 and a second surface 202 opposite to the first surface 201. The microstrip feed line 100 can be disposed on the first surface 201. The at least two antenna switches 310 can be spaced from each other and disposed on the second surface 202. The at least one conducting plate 300 can be disposed on the second surface 202. One conducting plate 300 can be disposed between two adjacent antenna switches 310. The insulating layer 400 can cover the at least one conducting plate 300 and the at least two antenna switches 310. The at least one conducting plate 300 and the at least two antenna switches 310 can be disposed between the insulating layer 400 and the substrate 200. The at least two antenna patches 500 can be spaced from each other and disposed on the surface of the insulating layer 400 away from the substrate 200. Each of the antenna switches 310 can be disposed opposite to one antenna patch 500 such that terahertz waves in the microstrip feed line 100 generate excitation to the antenna patch 500 through the antenna switch 310.

In an embodiment, the terahertz transmitting antenna 10 further comprises at least two conducting electrodes 410 disposed on the insulating layer 400. Each conducting electrode 410 is opposite to one antenna switch 310. The open and closed states of the antenna switch 310 opposite to the conducting electrode 410 are controlled by varying the voltage between the conducting electrode 410 and the conducting plate 300.

The terahertz spectrum receiving unit 3 is configured to receive an absorption spectrum of the terahertz waves transmitted from the terahertz transmitting antenna 10 after the terahertz waves passing through a target substance. The terahertz spectrum receiving unit 3 can be a differential detector, a superconducting Josephson junction detector, or a pyroelectric detector. The terahertz spectrum receiving unit 3 can be configured to receive the absorption spectrum in a terahertz frequency.

The terahertz spectrum analysis and identification unit 4 is configured to analyze and identify the terahertz absorption spectrum of the target substance. The terahertz spectrum analysis and identification unit 4 can store a terahertz spectrum database of common hazardous chemicals, and quickly identify information such as type and concentration of the target substance by implementing algorithms such as vector quantization network clustering algorithm, artificial neural network algorithm, and Mahalanobis distance classification.

The terahertz spectrum transmitting unit 1 can be signally coupled to the terahertz spectrum transmission unit 2. The terahertz spectrum transmission unit 2 can be signally coupled to the terahertz transmitting antenna 10. The terahertz spectrum receiving unit 3 can be configured to receive a terahertz frequency signal transmitted from the terahertz transmitting antenna 10. The terahertz spectrum receiving unit 3 can be signally connected to the terahertz spectrum analysis and identification unit 4. The terahertz spectrum transmitting unit 1, the terahertz spectrum transmission unit 2, and the terahertz transmitting antenna 10 can constitute a transmitting system. The terahertz spectrum receiving unit 3 and the terahertz spectrum analysis identifying unit 4 can constitute a receiving system. A space between the transmitting system and the receiving system can be a detecting area. Substances within the detection area can be detected and analyzed by the terahertz spectrum detection device 20.

The transmitting system and the receiving system can be packaged within the terahertz spectral detection device 20.

The configuration of the terahertz spectral detection device 20 is not limited. The size of the terahertz spectral detection device 20 can be relatively small. Considering the effective transmitting range of the terahertz transmit antenna 10 and the power of the transmitting source, a distance between the transmitting system and the receiving system can be in a range of a few centimeters to tens of centimeters. In use, the height of the transmitting system and the height of the receiving system are identical so that the terahertz waves in a wide bandwidth can be accurately transmitted.

In one embodiment, the terahertz spectral detection device 20 comprises a miniaturized and portable terahertz transmitting antenna 10. The terahertz transmitting antenna 10 can efficiently transmit a tuned or multi-frequency spliced broadband terahertz signal. The terahertz spectral detection device 20 can effectively solve the problem that the conventional terahertz sources have a relatively low transmitting power and a relatively narrow transmitting bandwidth. The terahertz spectral detection device 20 can be conveniently applied to various accident sites of hazardous chemicals, directly obtaining the transmission spectrum of the target substances in the terahertz band, and realizing rapid detection of the types and contents of hazardous chemicals in the atmospheric environment.

Figure 3:
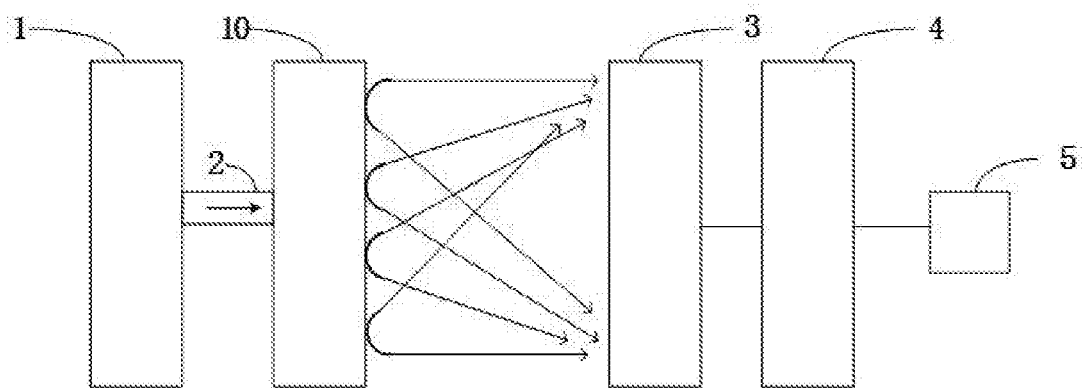
FIG. 3 is a schematic structural view of an embodiment of a terahertz spectral detection device.

Referring to FIG. 3, in an embodiment, the transmitting system comprising the terahertz spectrum transmitting unit 1, the terahertz spectrum transmission unit 2, and the terahertz transmitting antenna 10 is located at a left location. The receiving system comprising the terahertz spectrum receiving unit 3 and the terahertz spectrum analysis identifying unit 4 is located at a right location. The space between the transmitting system and the receiving system is the detecting area. The terahertz transmitting antenna 10 transmits a signal with a terahertz frequency to the terahertz spectrum receiving unit 3 through the detection area. In this embodiment, the transmitting system and the receiving system are directly opposite to each other. In another embodiment, the transmitting system can be an upper portion of the terahertz spectral detection device 20, and the receiving system can be a lower portion of the terahertz spectral detection device 20. The space between the upper transmitting system and the lower receiving system is the detecting area.

In one embodiment, the terahertz spectral detection device 20 is a transmissive type device. The detection area is between the terahertz transmitting antenna 10 and the terahertz spectrum receiving unit 3. The terahertz spectral detection device 20 can acquire a terahertz transmission spectrum of a sample located in the detection area. The terahertz spectrum analysis and identification unit 4 analyzes the obtained terahertz transmission spectrum to obtain information such as the type and concentration of the sample. For example, when detecting hazardous chemicals in the atmosphere at accident sites of hazardous chemicals or a biochemical terrorist attack, the detection area of the terahertz spectral detection device 20 is directly exposed in the atmospheric environment of the accident site. The terahertz spectral detection device 20 is capable of detecting the type and concentration of hazardous chemicals contained in the atmospheric environment at the location.

Figure 4:
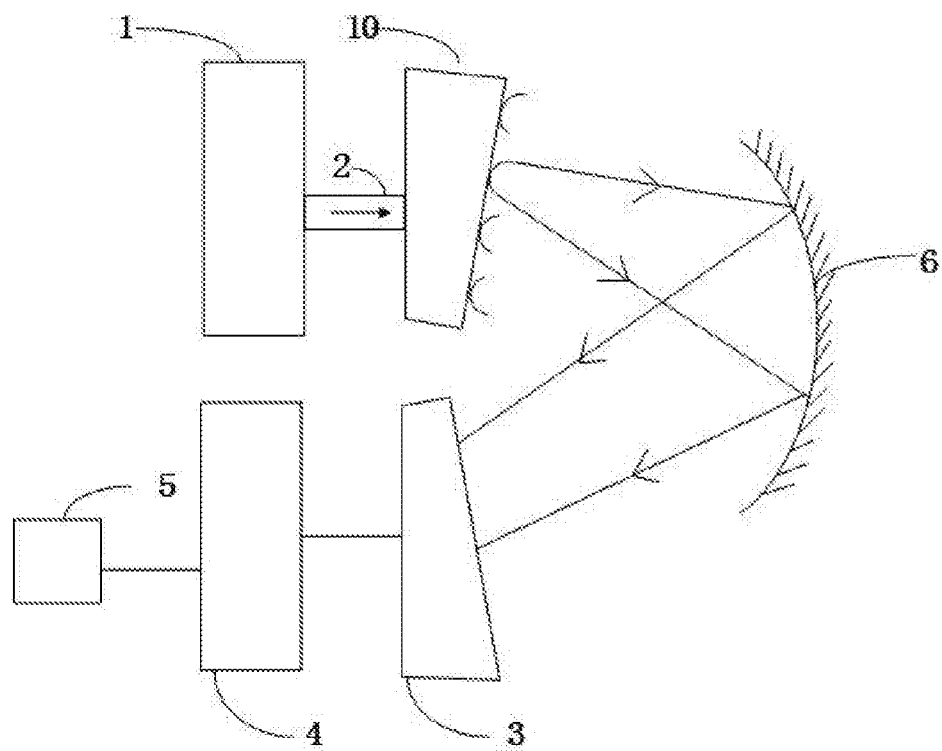
FIG. 4 is a schematic structural view of another embodiment of the terahertz spectral detection device.

Referring to FIG. 4, in an embodiment, the terahertz spectral detection device 20 further includes a reflecting mirror 6. The terahertz spectrum transmitting unit 1, the terahertz spectrum transmission unit 2, and the terahertz transmitting antenna 10 constitute the transmitting system at a position on the upper left. The terahertz spectrum receiving unit 3 and the terahertz spectrum analysis identifying unit 4 constitute the receiving system at a position on the lower left. The transmission of the signal between the terahertz transmitting antenna 10 and the terahertz spectrum receiving unit 3 is realized by the reflecting mirror 6. The relative positions of the transmitting system and the receiving system may not be limited to the upper left and lower left positions. For example, the transmitting system can be at an upper right position, and the receiving system can be at a lower right position. The relative positions of the transmitting system and the receiving system are capable of having the transmission of the signal between the terahertz transmitting antenna 10 and the terahertz spectrum receiving unit 3 through the reflecting mirror 6.

In one embodiment, the terahertz spectral detection device 20 is a reflective type device. The reflective terahertz spectral detection device 20 is applied in a similar manner to the above-mentioned transmissive type device 20. The terahertz transmission spectrum of the sample is measured by the terahertz spectrum receiving unit 3. As shown in FIG. 4, a terahertz spectrum signal is transmitted to the reflecting mirror 6 from the terahertz transmitting antenna 10. The terahertz spectrum signal is reflected by the reflecting mirror 6 to the terahertz spectrum receiving unit 3. In this reflective structure, the transmitting system and the receiving system are on the same side, and the reflecting mirror 6 is disposed therebetween. The reflecting mirror 6 can be a parabolic mirror.

In the embodiments shown in FIG. 3 and FIG. 4, the terahertz spectral detection devices 20 are compact and portable. The terahertz spectral detection device 20 can be brought to the detection site quickly and conveniently. The terahertz spectral detection device 20 can be applied to accident sites of hazardous chemicals and biochemical terrorist attack sites. The terahertz spectral detection device 20 is capable of detecting and identifying the type and content of hazardous gases in the atmosphere. The terahertz spectral detection device 20 is not limited to gas detection, and can also detect and identify terahertz spectral fingerprints of solid and liquid. The terahertz spectral detection device 20 can also be used in the fields such as chemical screening, drug test, and calibration of material characteristic based on terahertz spectroscopy.

In an embodiment, the terahertz spectrum detection device 20 further comprises a terahertz spectrum display unit 5. The terahertz spectrum display unit 5 can be electrically connected to the terahertz spectrum analysis and identification unit 4 for displaying the detected information. Specifically, the terahertz spectrum display unit 5 can be configured to display the detection results. When the terahertz spectral detection device 20 is used to detect the state of the hazardous chemicals in the environment, the detected information may include information such as the type and concentration of the hazardous chemicals.

The terahertz spectral detection device 20 can directly detect the terahertz absorption spectrum of the target substances, without using a femtosecond laser and a complicated time delay system. The terahertz spectral detection device 20 is characterized in miniaturization and portability, and can be quickly applied to various complicated sites. The terahertz transmitting antenna 10 can decrease a requirement for the transmitting bandwidth of the terahertz source. There is no need for the terahertz spectral detection device 20 to use an ultra-wideband terahertz transmitting source or a broadband tuned terahertz transmitting source. The terahertz spectral detection device 20 can use a combination of several narrow-frequency transmitting sources with several transmitting frequencies at the spectral fingerprints of several typical hazardous chemicals. The terahertz transmitting antenna 10 is advantageous for miniaturization and cost reduction of the terahertz spectral detection device 20. Modulating the spatial beam of the transmitted terahertz waves by the high-gain terahertz transmitting antenna 10 enhances the effective terahertz optical path in the terahertz spectrum detection device 20. The terahertz spectral detection device 20 adopts a multi-frequency transmitting technology, which can effectively reduce the interference of the components on the spectral fingerprint characteristics of specific target substances, and reduce the computation time of the spectral fingerprint recognition algorithm to achieve rapid identification of specific target substances.

The terahertz spectral detection device 20 can detect solid, liquid, and gaseous substances. The terahertz spectral detection device 20 can be used to detect hazardous chemicals in the atmosphere. For example, hazardous chemicals may generate HCN gas at the site of a fire accident. A characteristic peak of the terahertz absorption spectrum of HCN is 1.24 THz. When it is used to detect the existence of the HCN gas and the concentration of HCN gas at the site of the fire accident, the terahertz spectral detection device 20 can be taken to the site. The detection area of the terahertz spectral detection device 20 is in the atmospheric environment of the site. If the atmospheric environment contains HCN, the terahertz absorption spectrum received by the terahertz spectrum receiving system will exhibit an absorption peak at 1.24 THz. The algorithm built in the terahertz spectrum analysis and identification unit 4 can acquire the absorption peak corresponding to the HCN. Moreover, the concentration of HCN can be calculated from the intensity of the absorption spectrum and the terahertz optical path length of the detection area, and these results can be displayed by the terahertz spectrum display unit 5.

When the terahertz spectral detection device 20 is used to detect a solid or liquid sample, the sample can be directly placed in the detection area, and the terahertz transmission spectrum can be detected. For example, in detection of a package containing RDX explosives, whose terahertz absorption peaks are at 1.26 THz and 1.73 THz, the terahertz transmitting antenna 10 sequentially scans in four frequency bands of 1.0-1.5 THz, 1.5-2.0 THz, 2.0-2.5 THz, and 2.5-3.0 THz. The terahertz spectral analysis identification unit 4 then analyzes whether the frequency of the detected sample has absorption peaks at two frequencies of 1.26 THz and 1.73 THz. If there are the absorption peaks of 1.26 THz and 1.73 THz, the terahertz spectral display unit 5 shows the detection result that the package contains RDX. If there is no absorption peak of 1.26 THz and 1.73 THz, the terahertz spectral display unit 5 shows the detection result that the package is safe.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A terahertz transmitting antenna, comprising:
   a substrate comprising a first surface and a second surface opposite to the first surface;
   a microstrip feed line disposed on the first surface;

at least two antenna switches spaced from each other and disposed on the second surface;

at least one conducting plate disposed on the second surface, and one conducting plate is disposed between each two adjacent antenna switches;

an insulating layer covering the at least one conducting plate and the at least two antenna switches, the at least one conducting plate and the at least two antenna switches being disposed between the insulating layer and the substrate; and at least two antenna patches spaced from each other and disposed on a surface of the insulating layer away from the substrate;

wherein each antenna switch is opposite to one antenna patch such that a terahertz wave transmitted in the microstrip feed line generates an excitation to the antenna patch through the antenna switch.

2. The terahertz transmitting antenna of claim 1, further comprising at least two conducting electrodes disposed in the insulating layer, wherein each conducting electrode is spaced from and opposite to one antenna switch, and open and closed states of the antenna switch are controlled by changing a voltage between the conducting electrode opposite to the antenna switch and the conducting plate.

3. The terahertz transmitting antenna of claim 1, wherein the at least two antenna switches have different widths and correspondingly transmit terahertz waves with different frequency widths.

4. The terahertz transmitting antenna of claim 3, wherein the widths of the at least two antenna switches decrease along a fixed direction, and the transmission frequencies of the at least two antenna switches increase along the fixed direction.

5. The terahertz transmit antenna of claim 1, wherein a material of the at least two antenna switches is dielectric.

6. The terahertz transmitting antenna of claim 5, wherein the material of the at least two antenna switches is graphene, and the graphene is disposed on the second surface.

7. A terahertz spectral detection device, comprising:
a terahertz spectrum transmitting unit;
a terahertz spectrum transmission unit signally coupled to the terahertz spectrum transmitting unit;
a terahertz transmitting antenna, the terahertz spectrum transmission unit signally coupling the terahertz spectrum transmitting unit to the terahertz transmitting antenna;
a terahertz spectrum receiving unit configured to receive a signal with a terahertz frequency transmitted by the terahertz transmitting antenna; and
a terahertz spectrum analysis and identification unit signally coupled to the terahertz spectrum receiving unit;
wherein the terahertz transmitting antenna comprises:
a substrate comprising a first surface and a second surface opposite to the first surface;
a microstrip feed line disposed on the first surface;
at least two antenna switches spaced from each other and disposed on the second surface;
at least one conducting plate disposed on the second surface, and one conducting plate is disposed between each two adjacent antenna switches;
an insulating layer covering the at least one conducting plate and the at least two antenna switches, the at least one conducting plate and the at least two antenna switches being disposed between the insulating layer and the substrate; and
at least two antenna patches spaced from each other and disposed on a surface of the insulating layer away from the substrate;
wherein each antenna switch is opposite to one antenna patch such that a terahertz wave transmitted in the microstrip feed line generates an excitation to the antenna patch through the antenna switch.

8. The terahertz spectral detection device of claim 7, wherein a transmission of terahertz frequency signal is directly implemented between the terahertz transmitting antenna and the terahertz spectrum receiving unit.

9. The terahertz spectral detection device of claim 7, further comprising a reflecting mirror, wherein the reflecting mirror is configured to implement the transmission of terahertz frequency signal between the terahertz transmitting antenna and the terahertz spectrum receiving unit.

10. The terahertz spectral detection device of claim 7, further comprising a terahertz spectrum display unit, wherein the terahertz spectrum display unit is electrically connected to the terahertz spectrum analysis and identification unit to display detected information.

11. The terahertz spectral detection device of claim 7, wherein the terahertz transmitting antenna further comprises at least two conducting electrodes disposed in the insulating layer, wherein each conducting electrode is spaced from and opposite to one antenna switch, and open and closed states of the antenna switch are controlled by changing a voltage between the conducting electrode opposite to the antenna switch and the conducting plate.

12. The terahertz spectral detection device of claim 7, wherein the at least two antenna switches have different widths and correspondingly transmit terahertz waves with different frequency widths.

13. The terahertz spectral detection device of claim 12, wherein the widths of the at least two antenna switches decrease along a fixed direction, and the transmission frequencies of the at least two antenna switches increase along the fixed direction.

14. The terahertz spectral detection device of claim 7, wherein a material of the at least two antenna switches is dielectric.

15. The terahertz spectral detection device of claim 14, wherein the material of the at least two antenna switches is graphene, and the graphene is disposed on the second surface.

* * * * *